(12) United States Patent
Huis

(10) Patent No.: US 12,414,203 B2
(45) Date of Patent: Sep. 9, 2025

(54) HEATING DEVICE

(71) Applicant: Robert Bosch GmbH, Stuttgart (DE)

(72) Inventor: Michael Huis, Freiberg Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 571 days.

(21) Appl. No.: 17/762,946

(22) PCT Filed: Sep. 10, 2020

(86) PCT No.: PCT/EP2020/075348
§ 371 (c)(1),
(2) Date: Mar. 23, 2022

(87) PCT Pub. No.: WO2021/058291
PCT Pub. Date: Apr. 1, 2021

(65) Prior Publication Data
US 2022/0394820 A1 Dec. 8, 2022

(30) Foreign Application Priority Data
Sep. 23, 2019 (DE) ............ 10 2019 214 435.7

(51) Int. Cl.
H05B 1/02 (2006.01)
F01N 3/20 (2006.01)
H05B 3/82 (2006.01)

(52) U.S. Cl.
CPC ......... H05B 1/0244 (2013.01); F01N 3/2066 (2013.01); H05B 1/0213 (2013.01);
(Continued)

(58) Field of Classification Search
CPC ............. H05B 1/0244; H05B 1/0213; H05B 1/0236; H05B 3/82; H05B 2203/007;
(Continued)

(56) References Cited

U.S. PATENT DOCUMENTS 4,316,080 A * 2/1982 Wroblewski ....... G05D 23/1919
219/505
2007/0157602 A1* 7/2007 Gschwind .......... F02M 37/0082
60/285
2008/0277401 A1* 11/2008 Hafner .................. F01N 3/2066
220/592.28

(Continued)

FOREIGN PATENT DOCUMENTS

| CN | 101306746 A | 11/2008 |
|---|---|---|
| CN | 104350249 A | 2/2015 |
| CN | 106460609 A | 2/2017 |
| CN | 107155225 A | 9/2017 |
| CN | 109555582 A | 4/2019 |
| DE | 102008014415 A1 | 11/2008 |

(Continued)

OTHER PUBLICATIONS

Translation of International Search Report for Application No. PCT/EP2020/075348 dated Nov. 24, 2020 (2 pages).

*Primary Examiner* — Mark A Laurenzi
*Assistant Examiner* — Kelsey L Stanek
(74) *Attorney, Agent, or Firm* — Michael Best & Friedrich LLP

(57) ABSTRACT

The invention relates to a heating device (3) for a storage container with a urea reducing agent, comprising at least one electrically operatable heating element (6) and a heat distribution element (7) which is thermally coupled to the heating element (6), wherein the heating element (6) has a first heating sub-element (40) which has at least one positive temperature coefficient thermistor (5), and the first heating sub-element (40) is connected to a second heating sub-element (42, 52, 62) which is designed to reduce the dependence of the heat output of the heating device (3) on an electric voltage applied to the heating element (6) in the event of an electric voltage with large values, in particular above 13 volt, so that the heat output dispensed to the thermal conducting element and the surrounding components with plastic encapsulation is not too high.

17 Claims, 5 Drawing Sheets

(52) U.S. Cl.
CPC ............. *H05B 1/0236* (2013.01); *H05B 3/82* (2013.01); *F01N 2610/02* (2013.01); *F01N 2610/10* (2013.01); *F01N 2610/1406* (2013.01); *F01N 2610/1433* (2013.01); *H05B 2203/007* (2013.01); *H05B 2203/02* (2013.01); *H05B 2203/021* (2013.01)

(58) Field of Classification Search
CPC .......... H05B 2203/02; H05B 2203/021; H05B 2203/019; F01N 3/2066; F01N 2610/02; F01N 2610/10; F01N 2610/1433
USPC ...... 392/451; 219/452.12, 505; 338/23, 22 R
See application file for complete search history.

(56) References Cited

U.S. PATENT DOCUMENTS

| | | | | |
|---|---|---|---|---|
| 2009/0078692 A1* | 3/2009 | Starck | ................... | B60K 13/04 |
| | | | | 219/202 |
| 2013/0068755 A1* | 3/2013 | Frutschy | .......... | H01M 10/6571 |
| | | | | 219/542 |

FOREIGN PATENT DOCUMENTS

| | | | | |
|---|---|---|---|---|
| DE | 102014105298 A1 | 10/2015 | | |
| DE | 102014107519 A1 | 12/2015 | | |
| DE | 102015200168 A1 | 7/2016 | | |
| DE | 102018212606 A1 | 1/2020 | | |
| EP | 3764739 A1 * | 1/2021 | ............ | A47J 27/004 |
| GB | 2568587 A * | 5/2019 | ........... | F24H 9/1827 |
| WO | 2007017080 A1 | 2/2007 | | |

* cited by examiner

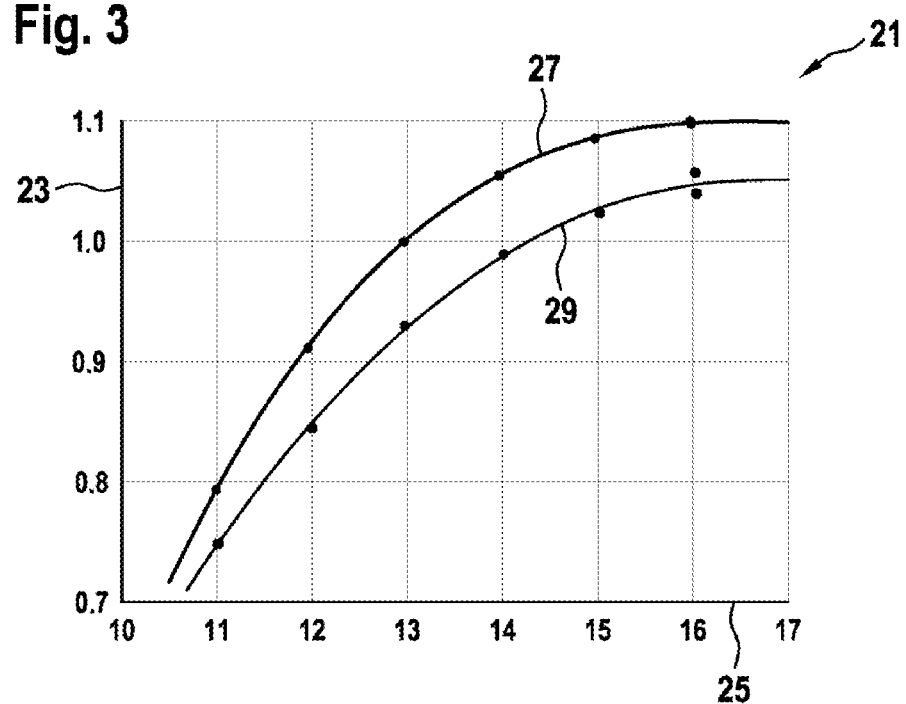
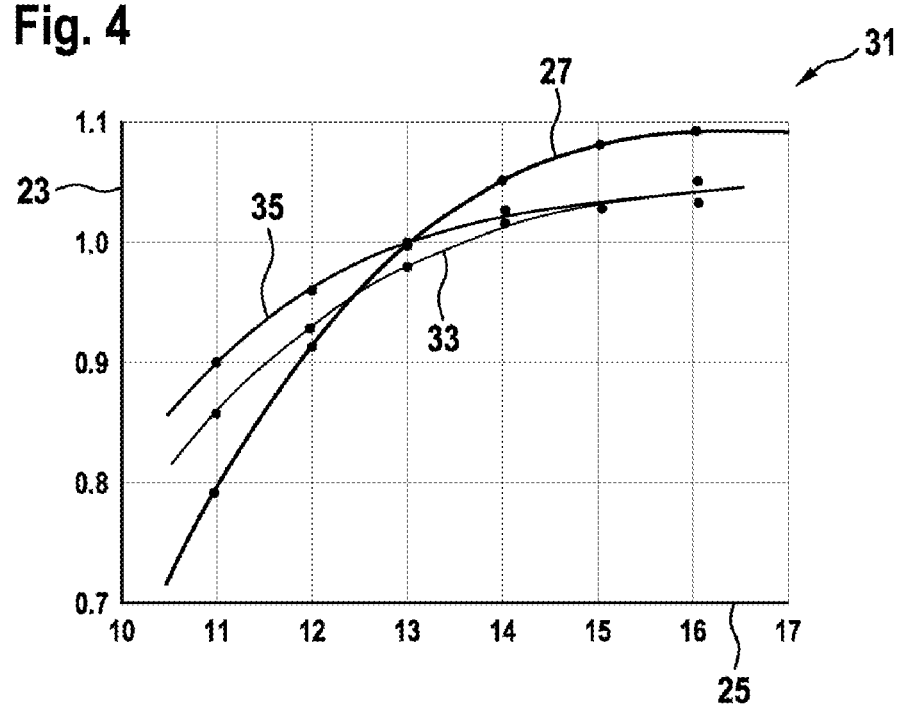

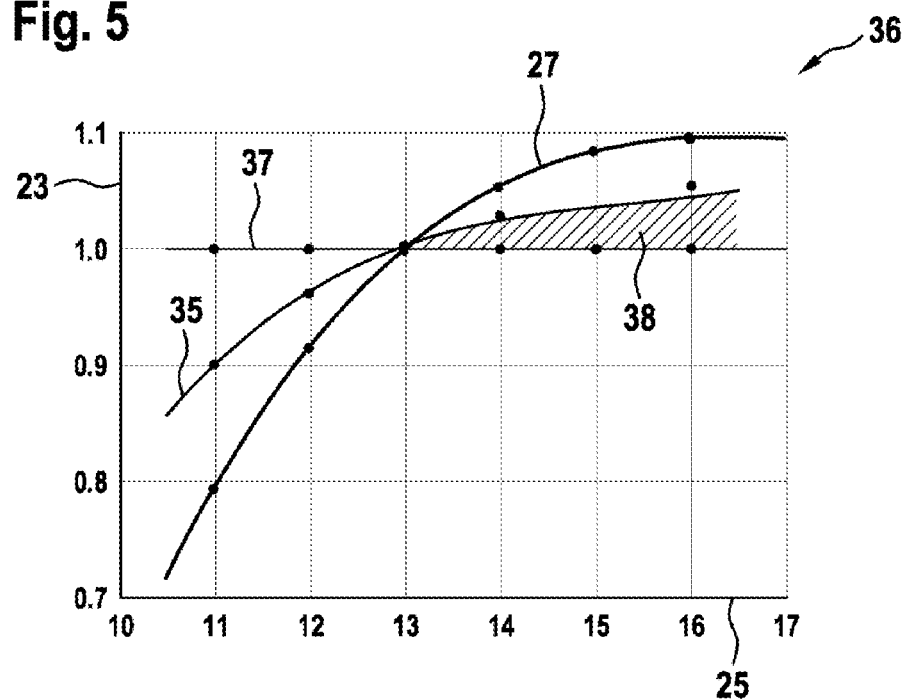
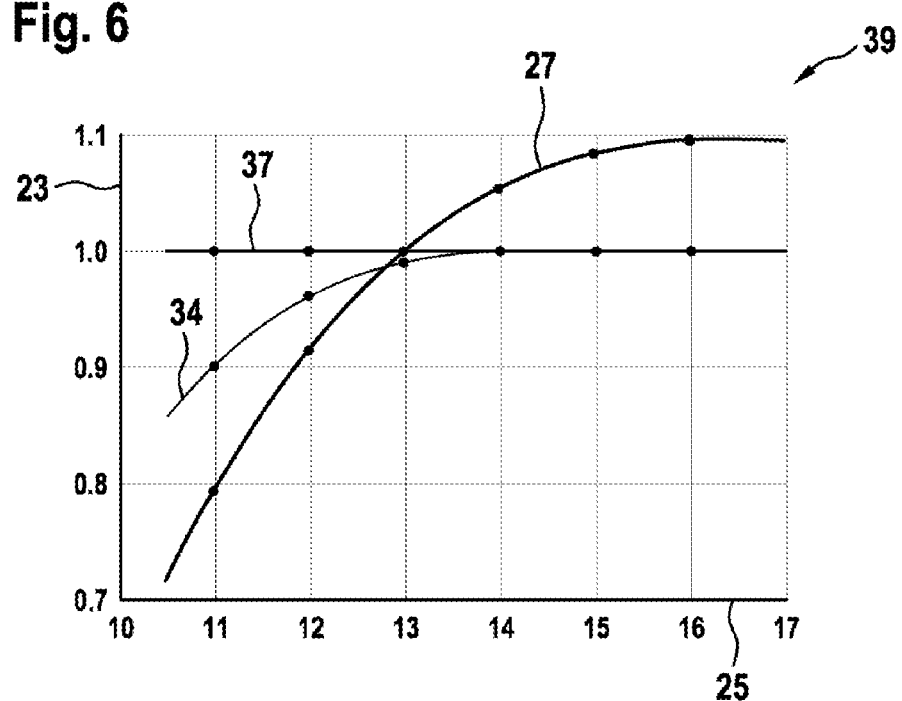

HEATING DEVICE

BACKGROUND OF THE INVENTION

The invention is based on a heating device.

One method to reduce nitrogen oxides in the exhaust gas of an internal combustion engine is the chemical reaction of ammonia and the nitrogen oxides to form water and nitrogen by use of a catalyst for selective catalytic reduction. Ammonia is produced when an aqueous urea solution is metered into the exhaust gas system as a result of chemical decomposition. This urea water solution is stored in a separate tank in the vehicle. This reducing agent has a freezing point of −11° C. A heater must therefore be provided in the reducing-agent storage container to thaw frozen aqueous urea solution.

From DE 10 2015 200 168 Al it is known to attach, or weld, to the bottom of such a storage container a delivery module that comprises a delivery pump in addition to a heater. Such a delivery module may also comprise further components, such as a fill-level sensor or a quality sensor for determining the composition of the liquid contained in the storage container. A filter arrangement is provided in this case on the suction side to protect in particular the delivery pump, but also downstream hydraulic components of a metering system.

If the reducing agent in the storage tank is in a frozen state when the vehicle is started, it must first be thawed before it can be used for exhaust gas cleaning. For this thawing process, legislation prescribes a maximum permitted time after which the exhaust gas cleaning system must function.

There are also stringent requirements for the sustained and recurrent thawing of the system. In these so-called "working day cycles" (WDC), a cyclical thawing, metering and refreezing is emulated on the basis of a passenger car used for traveling to work. In these and other system and legal requirements, the heating power provided by the tank heating device is of great importance, and what is sought is the provision of the greatest possible heating power.

From the post-published DE 10 2018 212 606 Al it is known to couple PTC elements to a metallic heat distribution body in a thermally conductive manner by pressing them onto the heat distribution body by means of a spring clip.

In such a coupling of a PTC element to a heat distribution body, the transfer of heat to the heat distribution body can be improved by adapting the surface of the metallic heat distribution body to the geometry of the PTC element, for example by machining it, in particular by polishing or smoothing it. To achieve the required heating power, additional processing steps are therefore required in the production of the heating device, or special materials are used, which can increase the costs.

SUMMARY OF THE INVENTION

In contrast, the heating device according to the invention, has the advantage of a heating power that, by simple means, is comparatively independent of fluctuations in the electrical supply voltage. In particular, it is also advantageous that, in the case of higher voltages, a compensating mechanism is provided that protects the heating device, and in particular a conceivable plastic encapsulation, from excessively high temperatures.

It is particularly advantageous in the thawing process to improve the heating power, and consequently the overall performance, of the heating device, comprising at least one positive temperature coefficient thermistor, by lowering the minimum resistance of the heating element, or of the positive temperature coefficient thermistor, or selecting a low value for the minimum resistance. The thus increased, or high, heating power results in shorter thawing times, better behavior in the WDC cycle and/or can be used as a power buffer for subsequent requirements. In particular, the extra power can be used to avoid expensive production steps or the use of an expensive heat sink material.

Further advantages are disclosed by the features stated in the further dependent claims and in the description.

BRIEF DESCRIPTION OF THE DRAWINGS

Exemplary embodiments of the invention are represented in the drawing and explained more fully in the description that follows.

In the drawing
FIG. 3 shows a further diagram,
FIG. 4 shows a further diagram,
FIG. 5 shows a further diagram,
FIG. 6 shows a further diagram.

DETAILED DESCRIPTION

Figure 1:
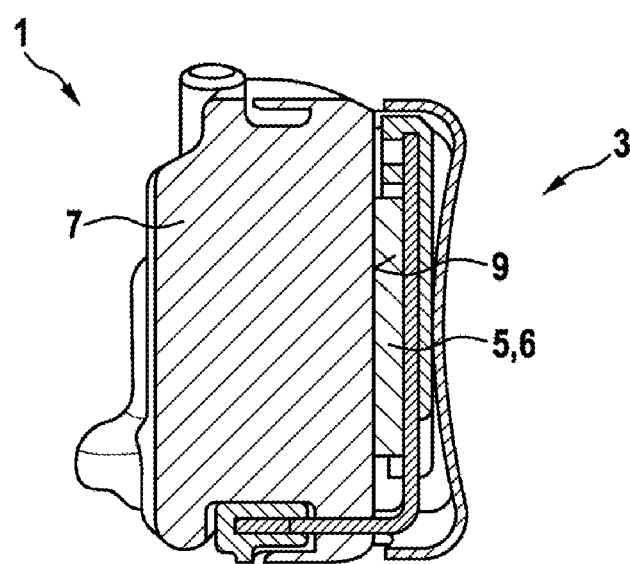
FIG. 1 shows a heating device.

FIG. 1 shows a cross-sectional view 1 of a heating device 3 as already described in the post-published patent application DE 10 2018 212 606 Al, the disclosure content of which is expressly incorporated in the present patent application. This heating device 3 can be integrated into a delivery module that can be installed in a storage container for a liquid reducing agent for the after-treatment of the exhaust gas of an internal combustion engine. The metal body, visible in cross-section, serving as a heat distribution element 7 is in good thermally conductive contact with a positive temperature coefficient thermistor, or PTC element 5, on a machined, in particular polished surface 9. Only one PTC element is visible in this cross-sectional side view. The entire heating element 6 preferably has two such PTC elements 5, connected in parallel. The heating device thus has a heating element 6 comprising two positive temperature coefficient thermistors 5 connected in parallel and a heat distribution element 7.

A PTC element converts supplied electrical energy into heat. These elements, also called positive temperature coefficient thermistors, have an inherent resistance that depends on the temperature. If the temperature of the element increases, its resistance also increases, with the result that less electrical power is converted into heat. This results in a self-regulation, or system intrinsic safety, of these elements. This principle is illustrated in FIG. 2.

Figure 2:
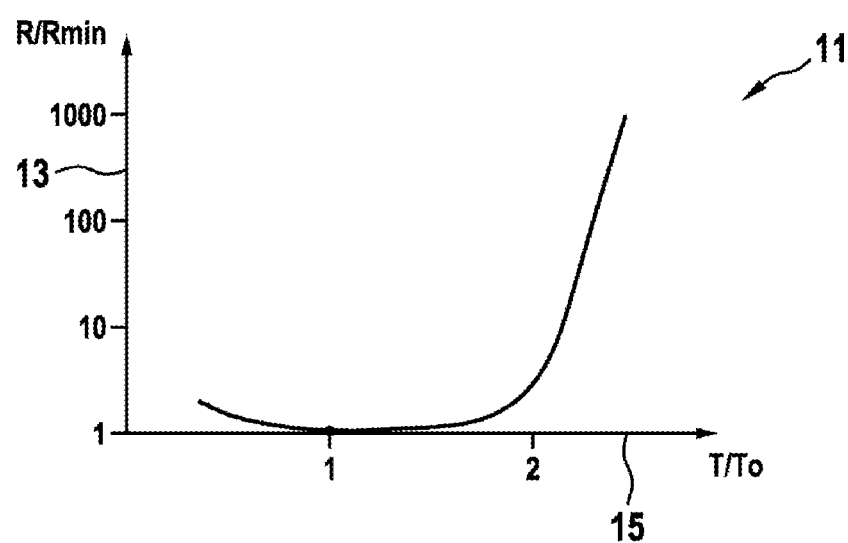
FIG. 2 shows a diagram.

FIG. 2, in a diagram 11, shows the temperature dependence of the electrical resistance of a positive temperature coefficient thermistor. The resistance 13 is plotted, normalized with respect to the minimum resistance value Rmin, over the temperature 15 of the positive temperature coefficient thermistor, normalized with respect to the temperature To, at which the resistance assumes the minimum resistance value Rmin. Such a resistance profile over temperature is typical for the positive temperature coefficient thermistor characteristic.

FIG. 3, in a diagram 21, shows the dependence of a normalized heating power 23 of a heating device on the applied voltage 25 in volts. In addition to the minimum resistance value, a positive temperature coefficient thermistor, or its heating power and the resulting heating power of the heating device, are also characterized by other physical characteristic quantities, for example the physical size of the positive temperature coefficient thermistor. In the following considerations, a standard size is assumed as the physical size. Also, the specifications for the minimum resistance Rmin of the heating element in the following relate, as an example, to a parallel connection of two positive temperature coefficient thermistors, each being of such a standard physical size. Both curves 27 and 29 show the voltage dependence for the same minimum resistance Rmin of two positive temperature coefficient thermistors connected in parallel, with a standard size of 1.605 ohms. The curve 27 describes the voltage dependence of the heating power of the heating device in the case of a machined, and thus heat-transfer-optimized, surface 9 of the heat distribution element 7, while the curve 29 relates to a heating device in which this surface has not been machined in such a manner. The normalization of the heating power relates to an applied voltage of 13 volts in the presence of a machined surface 9.

Diagram 21 shows that the heating power increases with increasing voltage, but the increase in heating power diminishes with increasing voltage. Furthermore, diagram 21 shows that, in the case of an unmachined surface of the heat distribution body in the region of the positive temperature coefficient thermistors, the heating power of the heating device is lower than in the case of a machined surface. Clearly identifiable is the lower power over the entire curve, which at the standard voltage of 13V corresponds to a reduction in power of approximately 7 percent. This would result in a significant loss of power, for example in the thawing of a frozen aqueous urea solution.

FIG. 4, in a diagram 31, again shows the curve 27 known from FIG. 3, which relates to a machined surface 9. Plotted next to it are two further curves 33 and 35. These two curves relate to an unmachined surface, similar to the curve 29 from FIG. 3, but for lower values for the minimum resistance of the parallel connection of the two positive temperature coefficient thermistors, each of a standard physical size. Thus, the curve 33 shows the dependence of the heating power of the heating device on the applied voltage in the case of a minimum resistance of 1.475 ohms (instead of 1.605 ohms), and the curve 35 in the case of a minimum resistance of 1.2 ohms. As shown by a comparison of the curve 35 with the curve 27, the heating power of the heating device increases by 11 percent at an applied voltage of 11 volts, despite an unmachined surface being used in the case of the curve 35, when the minimum resistance of the heating element is reduced from 1.605 ohms to 1.2 ohms.

Machining the surface of the heat distribution element requires an additional, costly machining step that only serves to achieve the planned heating power. The omission of such an expensive machining step can therefore be compensated, or overcompensated, with regard to its effects on the heating power of the heating device by reducing the minimum resistance of the heating element of the heating device, for example to 1.475 Ohm or to 1.2 ohms. This also makes it possible to use a more favorable casting material for the heat distribution element, which is designed, for example, as an aluminum heat sink. A reduced minimum resistance in this case has the effect, not only that the desired heating power is achieved at an applied voltage of 13 volts, despite a more simply produced heat distribution element, but also that the heating power is significantly increased at voltages lower than 13 volts. This has enormous advantages for an exhaust gas after-treatment system for the reduction of nitrogen oxides, since inter alia legal requirements must be met even at heating voltages as low as 11 volts. In particular, a greatly reduced minimum resistance thus results in the heating power curve being smoothed, and in particular raised, with a clear "performance" gain at low heating voltages.

FIG. 5 shows a diagram 36, which again shows the curves 27 and 35 known from FIG. 4. Represented next to them is an ideal curve 37 of the normalized heating power of the heating device. The hatched area 38 between the curve 35 and the ideal profile 37 marks the range of unwanted additional power of the heating device according to the curve 35, above an applied voltage of 13 volts.

The power converted by the heating device is expressed in an effective temperature of the heat distribution element, which in turn is directly related to the surface temperature of an encapsulation of the heating device, the encapsulation being composed, for example, of plastic, for example HDPE, and serving to protect the heating device from corrosive effects of the fluid. If the surface temperature of the encapsulation were to exceed a particular value, its material properties could change, resulting in increased penetrability, in particular for the corrosive reducing agent AdBlue, which in turn can have a negative effect on the service life of the heating device. To prevent this, excessively high surface temperatures must therefore be avoided, and therefore the range 38 in diagram 36 is undesirable. Optimal is a heating power 23, according to the ideal curve 37, that is at least largely non-dependent on the operating voltage 25, in order on the one hand to leave the heating power largely unaffected by operating voltage fluctuations on board a motor vehicle, for example in a range of between 11 volts and 16 volts, and on the other hand to be able to provide the same high, but not excessively high, heating power even at low voltages close to 11 volts.

It has already been described in connection with FIGS. 3 and 4 how, by selection of a low minimum resistance for a positive temperature coefficient thermistor, the heating power at low voltages can be raised closer to the ideal profile 37. However, a low minimum resistance also contributes to undesirably high power outputs at voltages greater than 13 volts (see range 38 in diagram 36 of FIG. 5).

In order to prevent a certain encapsulation temperature from being exceeded in general, i.e. irrespective of the specific choice of minimum resistance, but in particular when a low minimum resistance is selected, at high voltages, the minimum resistance must be dependent on the applied voltage, or there is a need for temperature control of the power for high voltages.

This can be achieved by the at least one electrically operable heating element 6 of the heating device having a first heating sub-element that comprises the at least one positive temperature coefficient thermistor 5 already described, the first heating sub-element being connected to a second heating sub-element that is configured to reduce the dependence of the heating power of the heating device on a voltage applied to the heating element in the case of high voltages, in particular above 13 volts. Diagram 39 of FIG. 6 shows, in the curve 34, in comparison with the ideal profile 37 and in comparison with the curve 27, the profile of the normalized heating power of the heating device in the case of use of a positive temperature coefficient thermistor having a low minimum resistance, of 1.2 ohms in this case, and when connected to a second heating sub-element, which brings the voltage profile of the heating power closer to the ideal profile 37 in the case of higher voltages above 13 volts.

Figure 7:
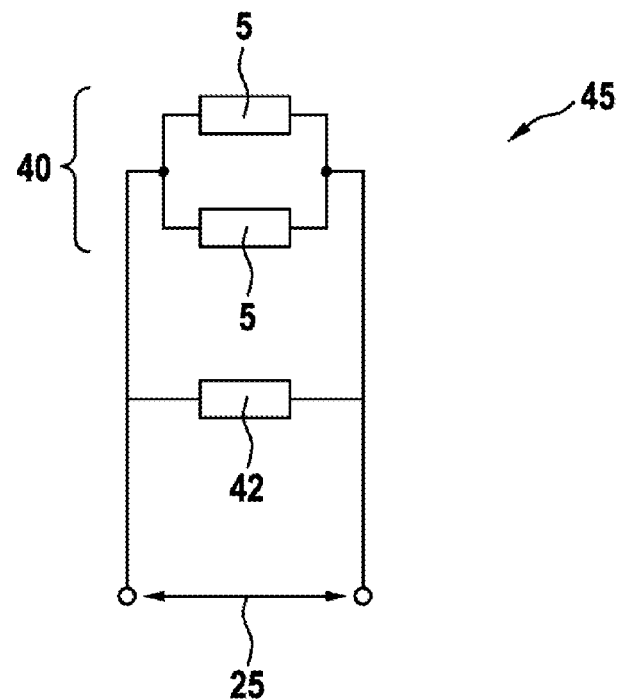
FIG. 7 shows a heating element circuit.

This can be achieved with a second heating sub-element, which is connected in parallel to the first heating sub-element 40. FIG. 7 shows such a heating element circuit 45, in which the first heating sub-element 40 is realized as a parallel connection of two positive temperature coefficient thermistors 5, the parallel connection of these two positive temperature coefficient thermistors 5 having a minimum resistance of 1.2 ohms. However, the minimum resistance may also have greater values such as, for example, 1.48 ohms, or even greater values. The second heating sub-element 42 is realized as a third heating resistor, preferably also in the form of a positive temperature coefficient thermistor. The voltage 25 can be applied to this parallel connection of the two heating elements. In the case of uncritical, i.e. low, temperatures, this third heating resistor is connected in parallel to the two positive temperature coefficient thermistors 5 at low resistance, and thus results in a reduced minimum resistance of the circuit 45, and thus in additional heating power at low voltages 25, compared to the sole provision of a parallel connection of the two positive temperature coefficient thermistors 5. If the temperature of the heat distribution element rises due to the application of a higher voltage, and exceeds a critical value for the encapsulation of the heat distribution element, the connection of the third heating resistor to the parallel connection of the two positive temperature coefficient thermistors 5 is effectively disconnected if a positive temperature coefficient thermistor having comparatively extremely steep regulation behavior is used as the second heating sub-element, or as the third heating resistor. This effective decoupling of the third heating resistor increases the effective minimum resistance of the circuit 45, thereby reducing the heating power, such that the temperature of the heat distribution element that is relevant for the plastic encapsulation decreases in a desired manner. In thermal equilibrium, this is expressed in the curve 34 of FIG. 6, in the heating power approaching the horizontal 37 as the voltage increases.

Figure 8:
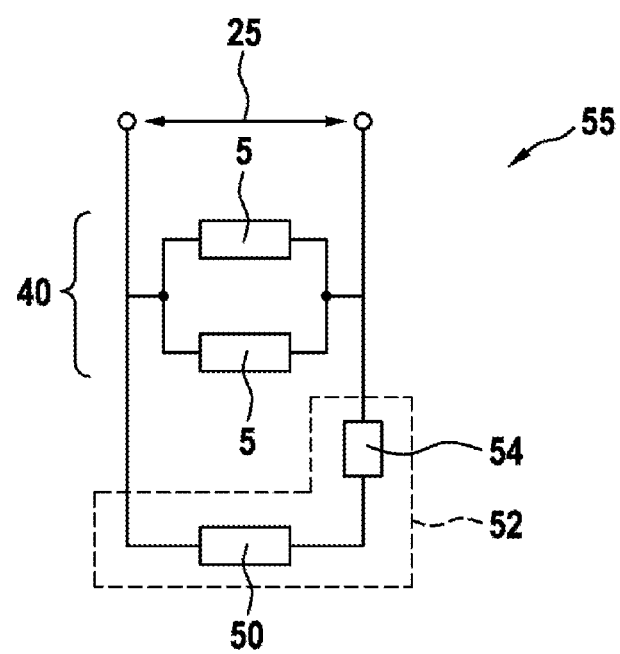
FIG. 8 shows a further heating element circuit.

FIG. 8 shows an alternative heating element circuit 55 comprising an alternative second heating sub-element 52, which has a positive temperature coefficient thermistor 50 connected in series to a switching element 54. In this example, the switching element 54 is realized as a bimetal contact. Like the second heating element 42 of the heating element circuit 45, the alternative second heating sub-element 52 of the alternative heating element circuit 55 is connected in parallel to the first heating sub-element 40. In contrast to the circuit shown in FIG. 7, a disconnection of the third heating resistor 50 from the first heating element 40 is achieved by the bimetallic contact when the latter breaks the electrical connection at high temperatures.

Figure 9:
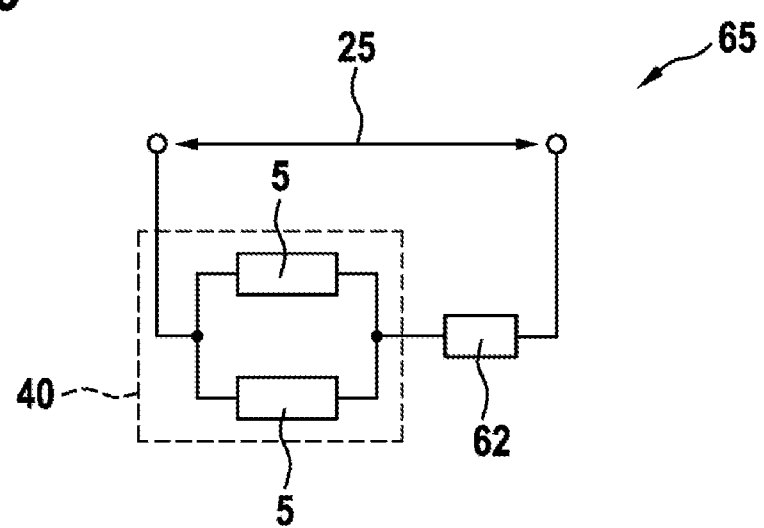
FIG. 9 shows a further heating element circuit.

FIG. 9 shows a further alternative heating element circuit 65, in which an alternative second heating sub-element 62 is connected in series to the first heating sub-element 40. The alternative second heating sub-element 62 is realized, in a manner similar to the second heating sub-element of the circuit 45 shown in FIG. 7, as a positive temperature coefficient thermistor having a comparatively extremely steep regulation behavior toward high temperatures.

The temperature-dependent switching point in all connection variants in this case is to be set in accordance with the encapsulation material. For example, a switching point of around 80° C. is conceivable for HDPE.

If the selected minimum resistance of the first heating element 40 is low, for example 1.48 ohms or 1.2 ohms, the increase in power due to the low minimum resistance is combined with the temperature-dependent switching point of the second heating sub-element described above (either due to its intrinsically strongly regulating temperature behavior or due to an expressly provided temperature-sensitive switch such as a bimetallic contact). In particular, such a combination results in a profile closely approximated to the optimum heating power curve, as represented by the curve 34 in FIG. 6.

The invention claimed is:

1. A heating device (3), comprising at least one electrically operable heating element (6) and a heat distribution element (7) that is thermally coupled to the heating element (6), wherein the heating element (6) has a first heating sub-element (40) that has at least one positive temperature coefficient thermistor (5), wherein the first heating sub-element (40) is connected in parallel to a second heating sub-element (42, 52, 62) that is configured to reduce a dependence of a heating power of the heating device (3) on a voltage applied to the heating element (6) in a case of values of the voltage above 13 volts, wherein the heating power increases with an increase in the voltage applied to the heating element (6), wherein a rate of increase of the heating power decreases with the increase in the voltage applied to the heating element (6).

2. The heating device as claimed in claim 1, wherein the first heating sub-element (40) has two positive temperature coefficient thermistors (5) connected in parallel.

3. The heating device as claimed in claim 1, wherein the second heating sub-element (42, 52) comprises a positive temperature coefficient thermistor having a heating power that does not substantially increase at voltages above about 13 volts.

4. The heating device as claimed in claim 1, wherein the second heating sub-element (52) comprises a temperature-dependent switching element (54).

5. The heating device as claimed in claim 4, wherein the switching element is a bimetal contact.

6. The heating device as claimed in claim 1, wherein the second heating sub-element (62) is connected in series to the first heating sub-element (40).

7. The heating device as claimed in claim 6, wherein the second heating sub-element (62) comprises a positive temperature coefficient thermistor having a heating power that does not substantially increase at voltages above a voltage threshold.

8. The heating device as claimed in claim 1, wherein an electrical resistance of the first heating sub-element (40) in its temperature profile has a minimum value (Rmin) that is less than 1.5 ohms.

9. The heating device as claimed in claim 8, wherein the minimum value (Rmin) is less than 1.48 ohms.

10. The heating device as claimed in claim 9, wherein the minimum value (Rmin) is approximately 1.2 ohms.

11. The heating device as claimed in claim 1, wherein the heat distribution element (7) is a metal body.

12. The heating device as claimed in claim 1, wherein the heating device is configured to heat a fluid.

13. The heating device as claimed in claim 12, wherein the fluid is a liquid.

14. The heating device as claimed in claim 13, wherein the fluid is a reducing agent for an after-treatment of an exhaust gas of an internal combustion engine.

15. The heating device as claimed in claim 12, wherein the heating device is configured for structural integration into a delivery module for pumping out the fluid from a storage container for the fluid.

16. The heating device as claimed in claim 15, wherein the heating device is configured to be permanently exposed to the fluid as a result of installation of the delivery module in a bottom, or in a region near the bottom, of the storage container.

17. The heating device as claimed in claim 16, wherein the heating device is encapsulated by a plastic.

\* \* \* \* \*